(12) United States Patent
Williams

(10) Patent No.: US 9,873,005 B1
(45) Date of Patent: Jan. 23, 2018

(54) FIREMAN'S CARRY STRAP

(71) Applicant: David C. Williams, Salem, VA (US)

(72) Inventor: David C. Williams, Salem, VA (US)

( * ) Notice: Subject to any disclaimer, the term of this patent is extended or adjusted under 35 U.S.C. 154(b) by 60 days.

(21) Appl. No.: 15/012,824

(22) Filed: Feb. 1, 2016

Related U.S. Application Data

(60) Provisional application No. 62/112,561, filed on Feb. 5, 2015.

(51) Int. Cl.
*A45F 3/14* (2006.01)
*A62B 35/00* (2006.01)

(52) U.S. Cl.
CPC ............... *A62B 35/00* (2013.01); *A45F 3/14* (2013.01); *A45F 2003/142* (2013.01)

(58) Field of Classification Search
CPC ............... A45F 3/14; A45F 2003/142; A45F 2005/006; B65G 7/12; A62B 35/00; A62B 35/0043; A62B 35/005
USPC ................. 224/257–260, 264; D3/327
See application file for complete search history.

(56) References Cited

U.S. PATENT DOCUMENTS

| | | | | |
|---|---|---|---|---|
| 148,744 A | * | 3/1874 | Parent ................. | E06C 7/187 182/8 |
| 1,490,066 A | * | 4/1924 | Carr ................... | A45F 3/14 182/3 |
| 2,651,441 A | * | 9/1953 | Rau .................... | A45F 3/14 224/259 |
| 3,841,542 A | * | 10/1974 | Hogensen, Jr. ........ | A45F 5/00 2/312 |
| 6,923,356 B2 | * | 8/2005 | Reynolds ............... | A45F 3/14 224/254 |
| 9,635,925 B2 | * | 5/2017 | Moreau ................. | A45F 5/00 |
| 2008/0203127 A1 | * | 8/2008 | Castillo-Garrison .. | A45C 13/30 224/607 |
| 2009/0014483 A1 | * | 1/2009 | Green .................. | A41D 13/0007 224/157 |
| 2009/0283560 A1 | * | 11/2009 | Burton ................. | A45F 3/14 224/257 |
| 2011/0309617 A1 | * | 12/2011 | Eley .................... | D04G 5/00 289/1.5 |
| 2012/0080463 A1 | * | 4/2012 | Mourad ................. | A44B 11/04 224/258 |
| 2016/0050906 A1 | * | 2/2016 | Owen .................. | A01M 31/006 24/3.13 |

* cited by examiner

*Primary Examiner* — Scott McNurlen
(74) *Attorney, Agent, or Firm* — Johnston Holroyd; Mary-Jacq Holroyd

(57) ABSTRACT

A length of strap having a handle along one end and a hookup loop extending from the handle to attach to a load. A release knot disposed about the free end of the strap having a bridge to the handle. The handle is disposed to bear the weight of a load alternatively on the strap or the handle when a worker lifts the handle. The knot holds fast when it is bearing the weight, and is slidably disposed when the weight is born by the handle.

20 Claims, 6 Drawing Sheets

FIREMAN'S CARRY STRAP

RELATED APPLICATIONS

This application claims the benefit of U.S. Provisional Application Ser. No. 62/112,561 entitled "Fireman's Carry Strap" filed on 5 Feb. 2015, the contents of which are incorporated herein by reference in its entirety.

COPYRIGHT NOTICE

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Emergency response workers must lift backboards, equipment, and other loads, and carry them on uneven and rural terrain. The handles used to carry the load place the weight on the workers in an uneven fashion. Struggling with such loads may lead to injuries, and increases the response time for rescue where a distance must be traveled by foot. This is especially true in remote or off road locations, as well as, with multistory dwellings.

U.S. Pat. No. 7,390,042 teaches an adjustable strap for a person to carry a heavy load in which the strap has an adjusting buckle near each end and a handle on each end. The length of the strap is adjusted using the buckle so a heavy load can be handled by a worker in a manner that permits the worker to safely carry the load in a variety of situations.

GB Patent No. 2,472,777 teaches an object carry body harness which uses a series of three straps buckles, latches, and a hook to carry objects on the hook. FR 2,797,436 teaches a similar device comprising two straps and a series of buckles and latches to carry an object. Both use a cross body belt, and suspend a strap with buckles from the belt, in which the opposite end of the straps from the belt is used to carry an object using a hook or other device to engage the object for carrying.

In each case, the use of buckles, or the like, to adjust the length of the object carrying strap is inconvenient and difficult. Just as any adjustment the straps of a carry bag is difficult and especially while bearing weight, these devices do not facilitate easy adjustment.

SUMMARY OF THE INVENTION

The present invention is drawn to a cross body carry strap which utilizes a release knot instead of a buckle arrangement to adjust the length of the cross body carry strap. This fireman's carry strap includes a length of strap having a handle disposed adjacent one end with a device hookup loop attachable across the handle. The weight of a backboard or other load is borne on the strap and/or on the handle. The opposite end of the strap is free and has a release stop disposed about the free end such that the free end may slide freely through the release knot without slipping out of position through the knot.

A prusik minding ring is disposed at the end of the handle to control the position of the free end, and a stop may be disposed on the end of the free end which prevents the free end of the strap from being accidentally sliding through the knot. A floating minding ring, which may include an optional floating minding ring handle, may also be provided about the strap on the opposite side of the knot from the prusik minding ring to facilitate sliding the knot down the strap towards the free end. The worker grabs the knot itself to pull the strap away from the free end.

The carry strap of the present invention was developed to assist rescue workers with carrying backboards, stokes baskets, various pieces of equipment, and other loads. Military, fire, and rescue workers can complete their tasks with help and relief carrying weight. In an emergency, the worker has the option of using their hands for purposes other than carrying the load, and otherwise may use one hand on the weight bearing handle to control the load while the shoulder bears the weight.

An advantage is that the back of the worker is maintained in line to prevent injury and allow the weight to be born in line with the torso facilitating lifting of the load. Yet a further advantage is better positioning for lifting the backboard off the floor instead of a deadlift with the worker positioned all the way down on the floor. Since a worker is not leaning over to pick up the load, then they are in a better position to bear the weight of the load with their entire body back upright.

An advantage of the present design is that adjustments to length of a single strap can be affected easily while the weight is being born on the strap. The greater distribution of load allows the rescue workers to be confident in remote rescue situations, and increases their endurance for longer efforts. This feature allows rescuers to keep the patient moving so that precious time is not lost.

An embodiment might weigh only about nineteen ounces without a carbineer or other metal retainer. The light weight adjustable strap distributes the weight, giving workers hand grip relief, utilizing muscles efficiently, and helping to prevent injury to the worker, while not adding significant weight to the effort.

The carry strap is easily adjustable while in use reducing the need to stop and adjust the load. The prusik captures progress to keep the strap from freely slipping therethrough, and has the advantage of allowing the strap to slide through when not bearing weight. Once the strap is bearing the weight of the load, the prusik will restrict movement through the knot. In operation with the carry strap, prusik holds fast when it is bearing the weight, and is slidably disposed when the weight is born by the handle.

The prusik is bound to a hookup loop which is attached to the handle opposite the first end of the strap. The attachment is effected by a retainer, which may be a carbineer or ring as customary in the rescue community or according to local practice or rules.

Another aspect of the present design is that it is completely washable. The entire device may be washed in a washing machine if placed in a washing bag to prevent the strap from becoming entangled in the machine accompanying wash. The strap may be hand washed with mild soap, and then autoclaved to disinfect or bathed in disinfecting UV light, as necessary.

Yet another advantage is that the present invention may be used by different sized people who are placed at the four corners of the gurney. The separate carry straps may be adjusted so that the gurney is held flat.

A further aspect of the present design is that it is light weight with a minimum amount of metal disposed upon the strap. The light weight nature of the device makes it easier to carry into the woods for off road/remote rescue, while the lack of or removable metal parts makes this embodiment readily washable.

The strap may be used to carry other pieces of equipment such as EMS supplies, creek pumps for forest or wilderness rescue, holding a firehose, as an extension of a spider strap or the like for larger equipment or people.

A radio or other equipment may be attached to the strap or handle without getting in the way of the primary function of the strap.

Another advantage of the carry strap is that it may be used to cinch up turnout gear. By using the carry strap to cinch up turnout gear, everything needed for an emergency can be grabbed in one load. This reduces the possibility of accidentally loosing or omitting gear.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF PREFERRED EMBODIMENTS

Figure 1A:
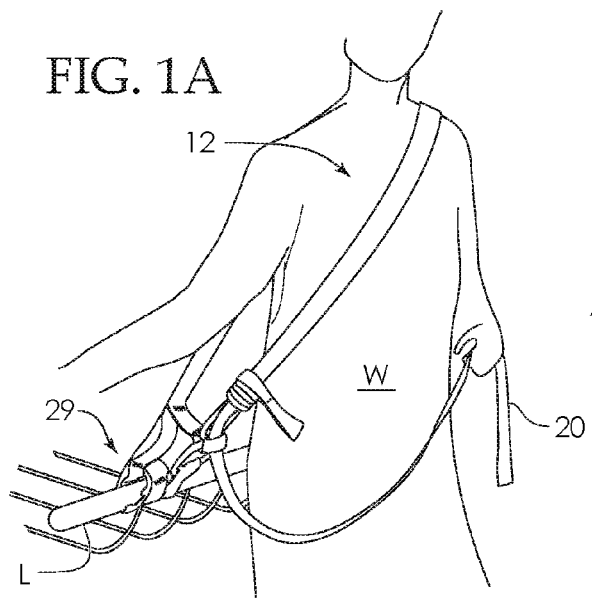
FIG. 1A is an environmental view of a carry strap according to the present invention in use to support a backboard.

FIG. 1A is an environmental view of a carry strap according to the present invention as used to support a backboard L, and demonstrates the cross body rescue strap 12 as used by a rescue worker W to carry an emergency cot, or other load L, in which a hookup loop 29 is wrapped around part of the load L, as shown allowing the rescue worker W to use their hands while also carrying the load L.

Figure 1B:
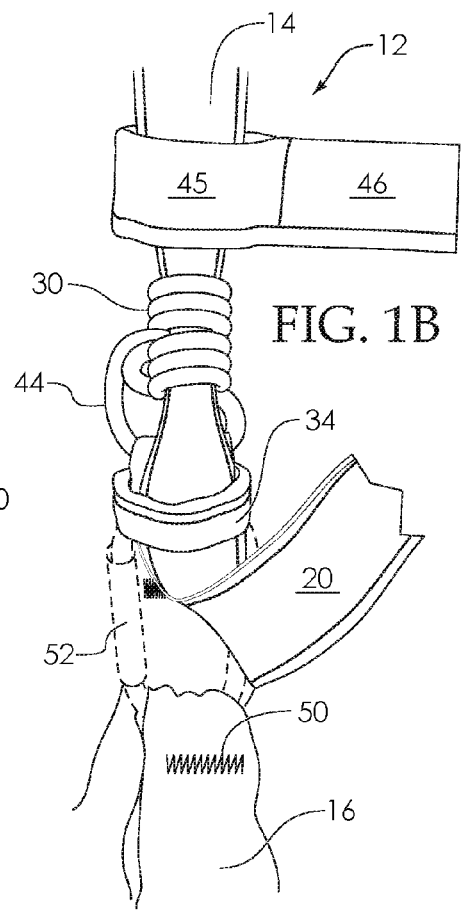
FIG. 1B shows a three wrap prusik and bridge length engaged in a weight bearing handle loop according to embodiments of the present invention.

FIG. 1B shows the details of the carry strap 12 from the perspective of the worker W from the front, and demonstrating the appearance of a slidable knot 30 with a bridge 44. The term minding as used herein is synonymous with attending, indicating moving under manual control. The release knot 30 is a composed of a length of rope 38 bound together at the ends 40 forming a loop (bridge) 44 that is attached to the weight bearing handle loop 28. A floating minding ring 45 with its floating minding ring handle 46 are shown disposed above the knot 30. A prusik minding ring 34 is shown disposed beneath the knot 30, and keeps the end of the strap 20 from slipping out of place or through the knot 30. The floating minding ring 45 is used to slide the knot 30 down the strap 14 towards the end 20 and keeps the knot from becoming warped or out of position.

Figure 1C:
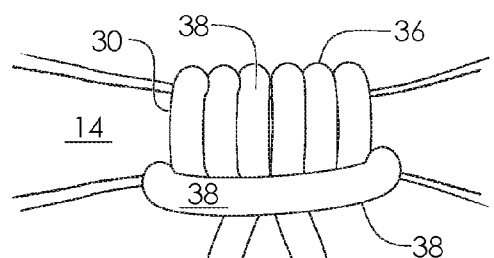
FIGS. 1C-1D show the three wrap prusik and bridge length from opposite sides.
Figure 1D:
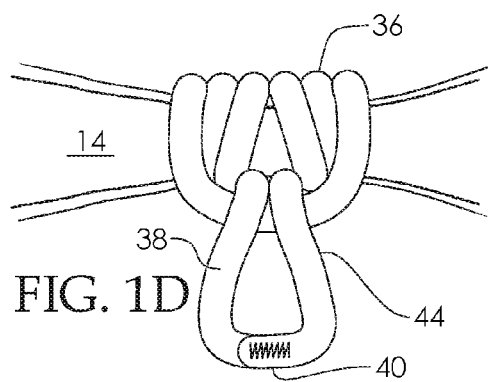

The preferred releasable knot is shown in FIGS. 1C and 1D. In this embodiment, the release knot 30 is a three wrap prusik 36 with the bridge 44 extending therefrom. The rope 38 is wrapped three times around the strap 14 with the two ends 40 bound together while extending from the middle of the knot, as shown in FIGS. 1C and 1D from opposite sides of the knot. The ends 40 are shown sewn together with bar tack stitching. The release knot 30 disposed along the strap 14 which is attached to the loop in the front end of the handle is shown in FIGS. 1C and 1D with the knot 30 from the back, and the front respectively. The release knot is a composed of a length of rope which for the three wrap prusik is forty-six (46") inches long for the example discussed hereafter.

According to the Oxford Dictionaries (www.oxforddictionaries.com), the term "prusik" refers to a method of ascending or descending a rope by means of two loops, each attached to it by a special knot tightening when weight is applied and slackening when it is removed, enabling the loop to be moved along the rope. 2016 Oxford University Press. The term is also used to reference the special knot which tightens when the weight is applied and slackens when the weight is removed. A variety of numbers of loops are used in different prusik knots and the three wrap prusik 36 may be replaced with another prusik configuration. The present invention includes prusik functioning knots which are known in the rescue, rope handling, and climbing industry, and is not limited merely to the specific three wrap prusik shown.

Figure 1E:
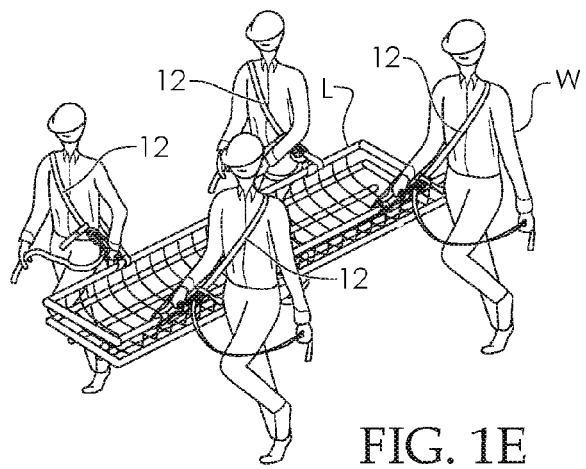
FIG. 1E is a thumb nail drawing demonstrating four emergency workers, with different heights, carrying a backboard demonstrating the use of the carry strap according to the present invention.

FIG. 1E is a thumb nail drawing demonstrating four emergency workers W, with different heights, carrying a backboard L demonstrating the use of the carry strap 12 according to the present invention. Although the image depicts four people carrying a backboard L, three or two people may be used instead.

Figure 2A:
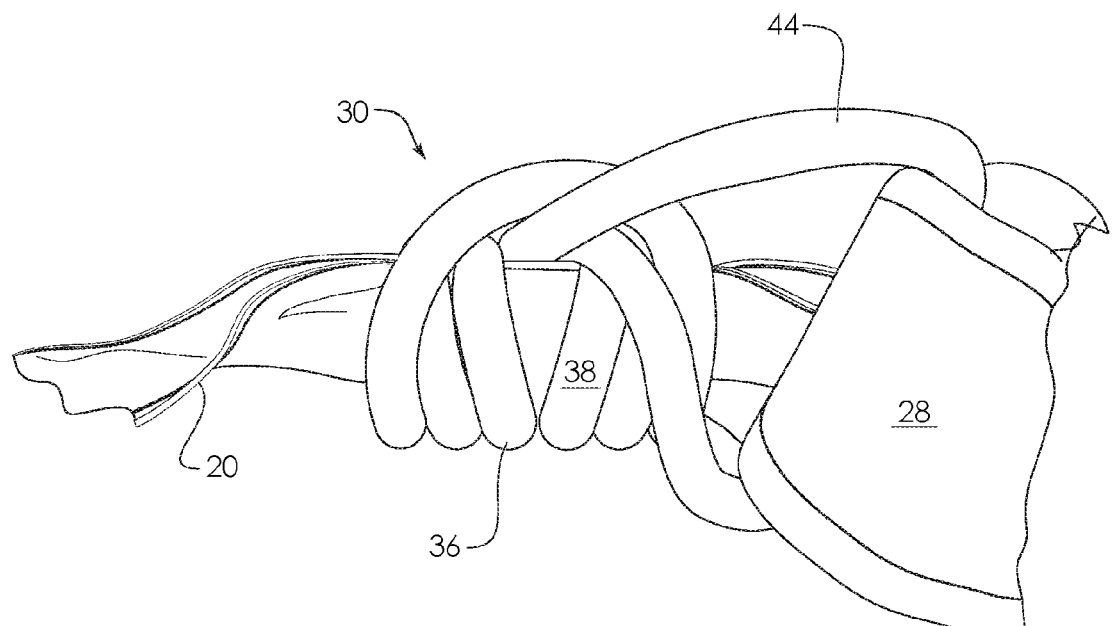
FIGS. 2A-2D shows the rigging of a three wrap prusik and bridge length according to the present invention from different angles.
Figure 2B:
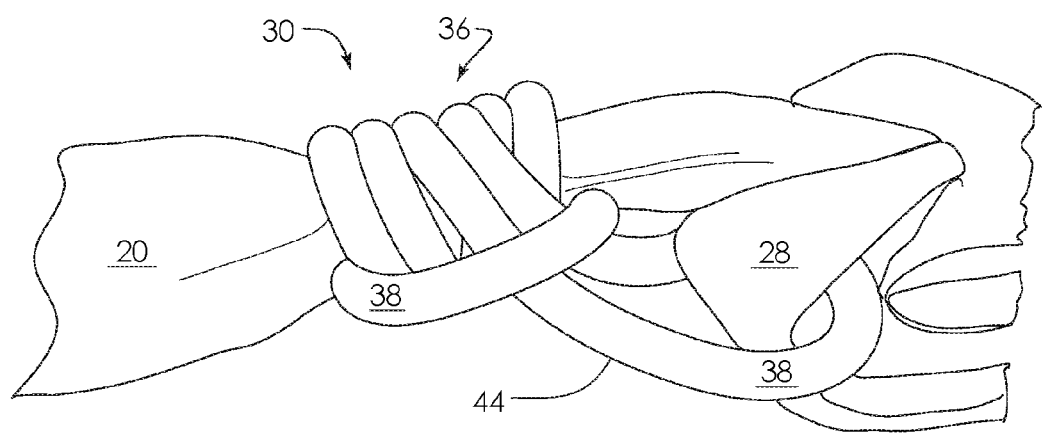
Figure 2C:
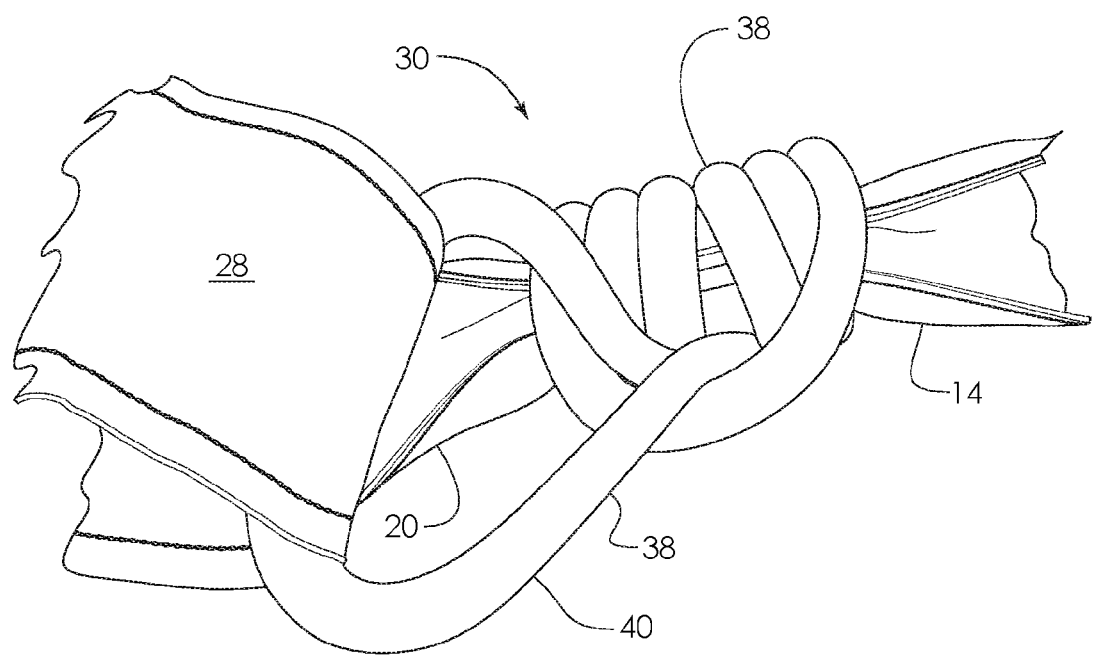
Figure 2D:
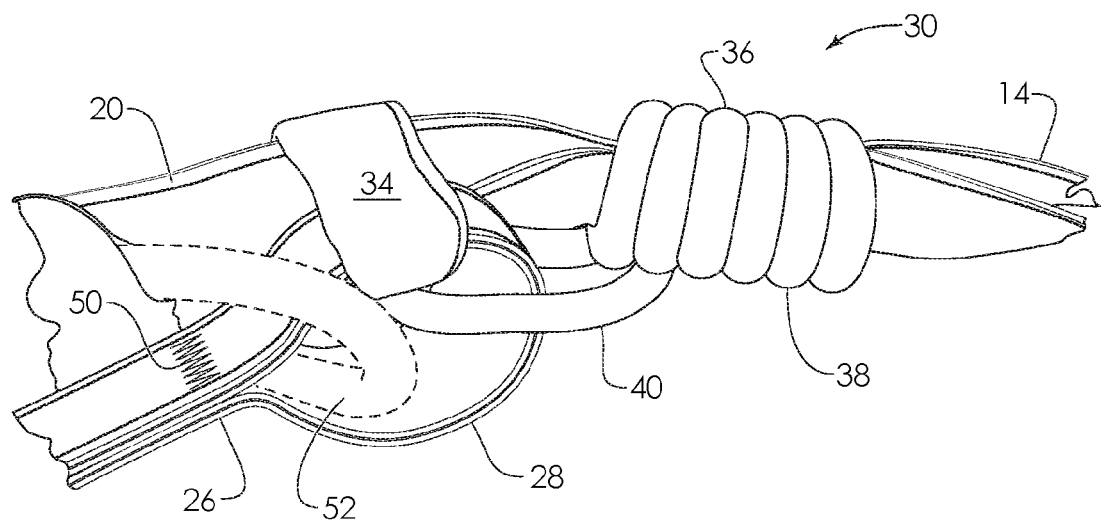

FIGS. 2A-2D shows the rigging of the three wrap prusik 36 and bridge 44 according to the present invention from different angles. As can be seen, the knot 30 is disposed about the strap 14. The bridge 44 engages the weight bearing handle loop 28. In operations, the amount of weight or absence of weight on the weight bearing handle loop 28 either tightens the knot 30 or loosens the knot 30. FIG. 2D shows that the weight bearing handle loop 28 has the bridge 44, the prusik minding ring 34 and a carbineer 52 engaged in the weight bearing handle loop 28. The end 20 side of the strap 14 can be seen threaded through the prusik minding ring 34 behind the weight bearing handle loop 28 from the view in FIG. 2D.

Figure 3A:
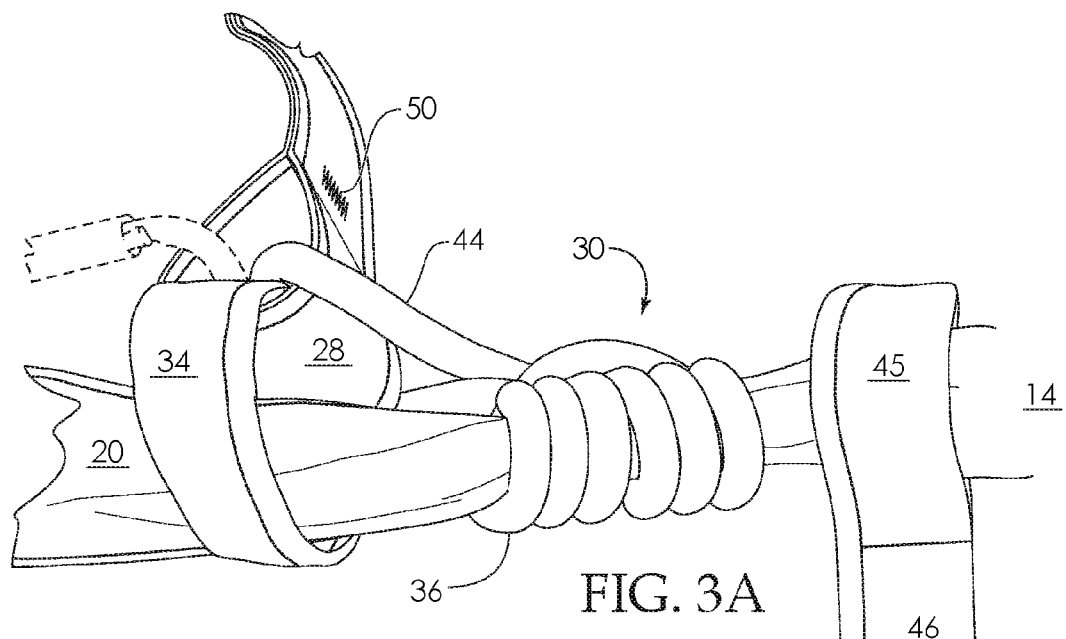
FIGS. 3A-3C shows the floating minding ring used to move the three wrap prusik down the length of the strap from different angles.
Figure 3B:
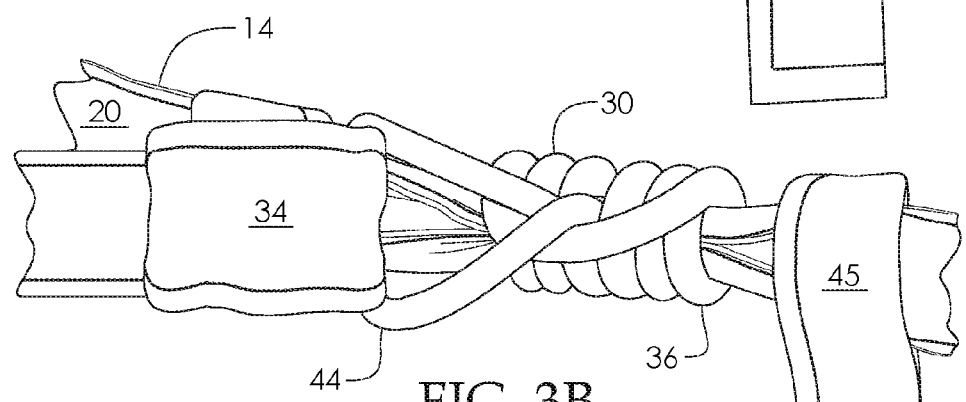
Figure 3C:
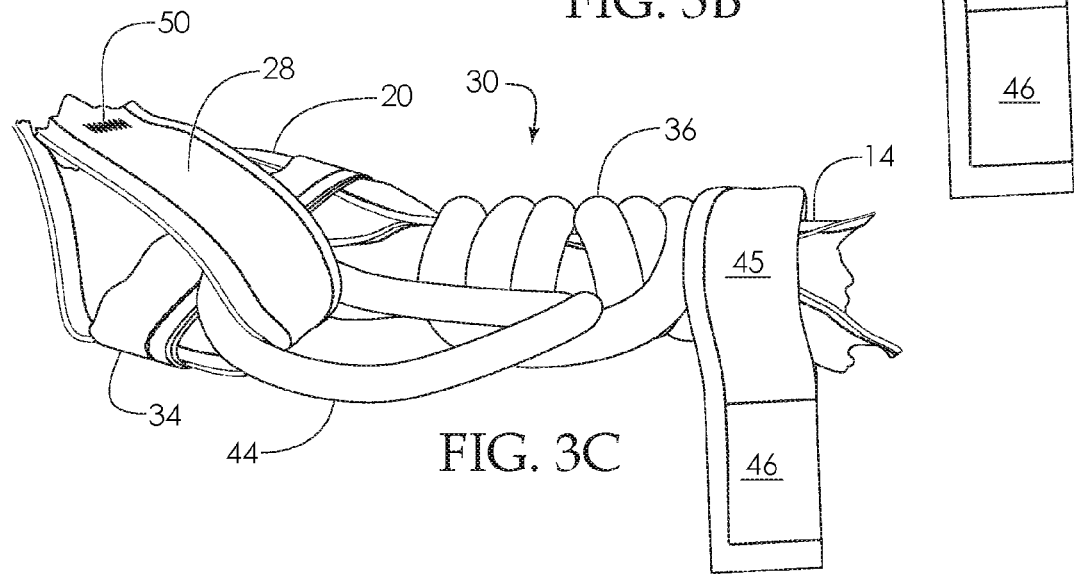

FIGS. 3A-3C further demonstrate the floating minding ring 45 as used to move the knot 30, in this case a three wrap prusik 36, down the length of the strap 14 from different angles. The floating minding ring 45 has a floating minding ring handle 46 extending therefrom. The prusik minding ring 34 remains on the weight bearing handle loop 28 to restrict movement of the end side 20 of the strap 14. The floating minding ring 45 may be made of solid webbing or metal.

Furthermore, the floating minding ring 45 may have a floating minding ring handle 46 made of solid webbing, metal, or a rubberized.

Figure 4A:
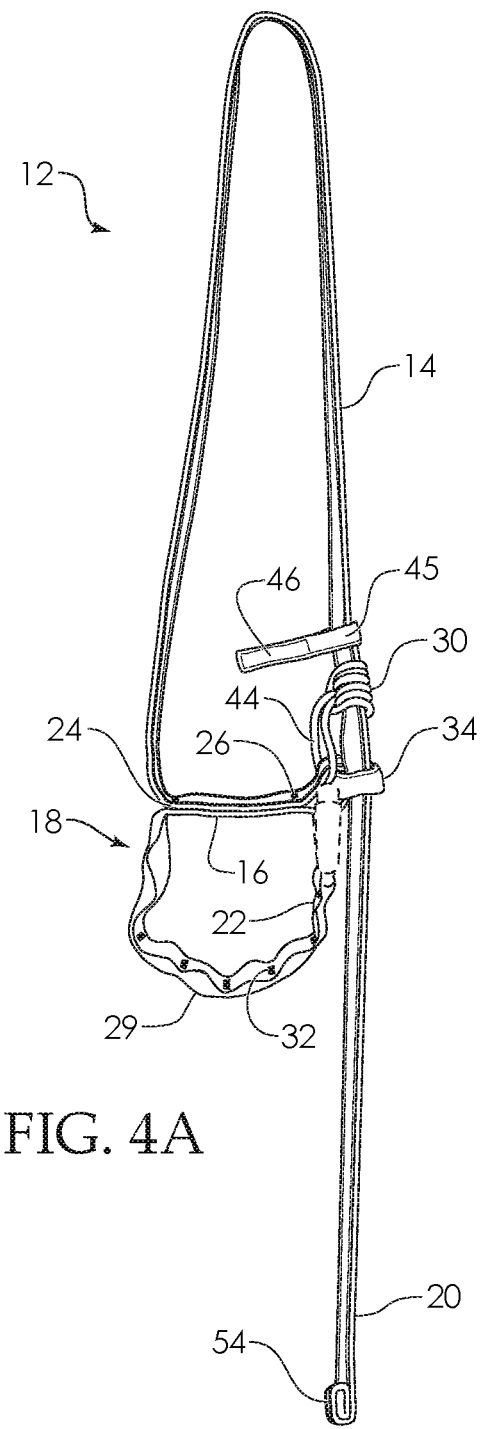
FIGS. 4A and 4B show the carry strap from the front and the back.
Figure 4B:
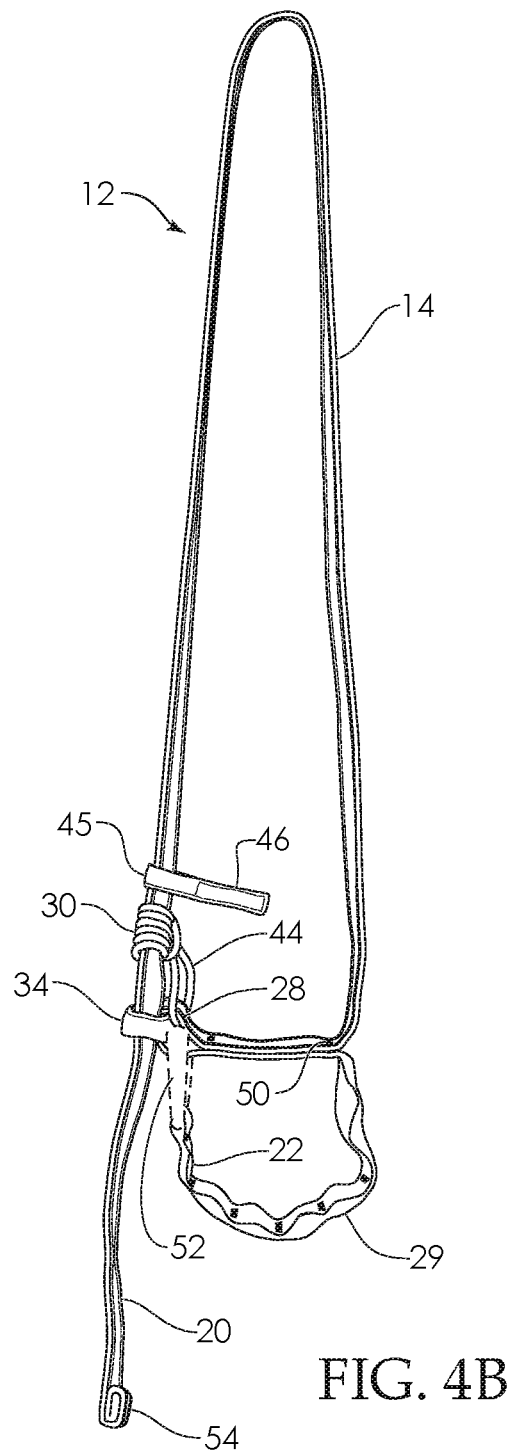

FIGS. 4A and 4B show the carry strap 12 in its entirety from opposite sides, but at different positions along a length of the strap 14. The cross body rescue strap 12 has a length of strap 14 having a weight bearing handle 16 disposed at a first end 18 with a free second end 20. The weight bearing handle 16 is disposed adjacent the first end 18 of the length of strap 14. A weight bearing hookup loop 29 extends to the end 22 from a back end 24 of the weight bearing handle 16, and is used to carry the load L. A front end 26 of the weight bearing handle 16 has a weight bearing handle loop 28. A release knot 30 disposed along the strap 14 and attached to the weight bearing handle loop 28 in the front end 26 of the weight bearing handle 16. The free second end of the strap 20 has a stop 54 at the very end. The stop 54 will not easily pass through the prusik minding ring 34, and therefore, is less likely to pass through the release knot 30.

Figure 5A:
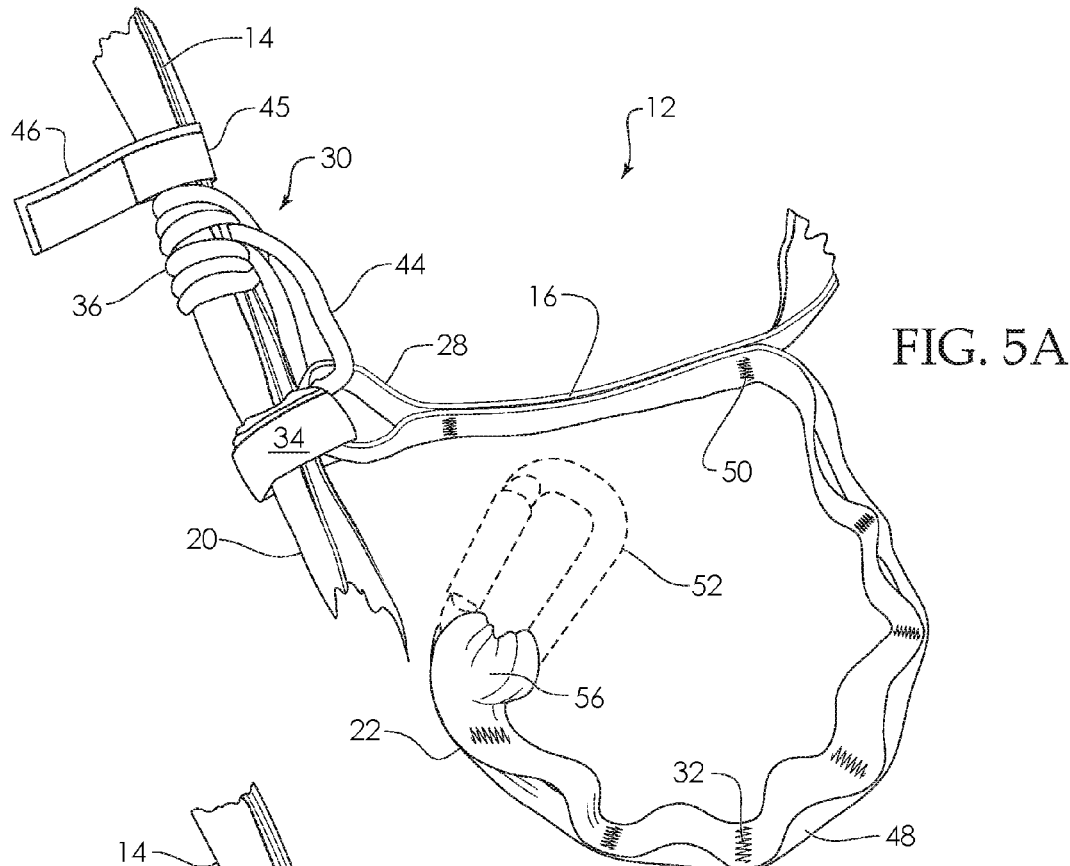
FIGS. 5A and 5B are close up views of the handles, the minding rings, and prusik with the hookup loop engaged and with the hookup loop disengaged which are parts of the carry strap according to the present invention.
Figure 5B:
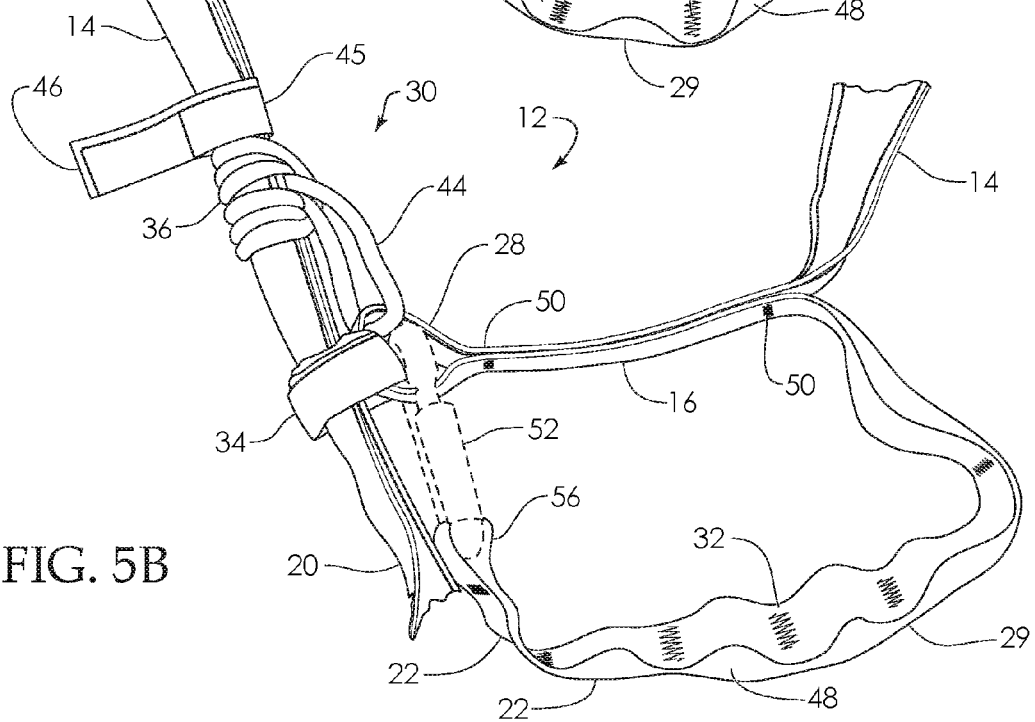

FIGS. 5A and 5B are close up views of the weight bearing handle 16, the minding rings 45 and 34, and the release knot 30 with the hookup loop 29 engaged and with the hookup loop 29 disengaged. The weight bearing handle 16 may be formed from doubled over lengths of strap. Furthermore, the weight bearing handle 16 may be formed from the length of strap 14 that makes up the carry strap 12. In an embodiment, the weight bearing handle 16 may be formed by folding over a length of the strap 14 near the first end 22, as shown in FIGS. 5A and 5B, with bar tacks 50. The weight bearing handle loop 28 may be formed at the end of the handle 16 past the bar tack 50.

The weight bearing handle 16 extends from the first end 22 and having a weight bearing hookup loop 29 with bar tacks 32 along the length thereof hanging form the hookup loop 29 end of the handle 16. The opposite end of the weight bearing handle 16 has a weight bearing handle loop 28 to accommodate an attachment to the weight hearing strap 12. The weight bearing hookup loop 29 may be formed from the handle's 16 strap being doubled over, and may include bar tacks 32, as shown in FIGS. 5A and 5B. The bar tacks 32 forming hookup loop gaps 48 which can engage a carbineer or other retainer 52 to hold the load L on the hookup loop 29. FIGS. 1A and 1E show the hookup loop 29 in operation wrapped around a backboard L.

A carbineer or other releasable retainer clip 52 is disposed on the end 22 of the strap 52 in a hookup loop gap 48 to attach to the weight bearing handle loop 28 to the hookup loop 29. The carbineer 52 is typically supplied by the worker W or their employer/emergency operators. Rescue departments typically specify which retainer clips 52 may be used for rescue purposes. The retainer 52 may be a wide variety of buckles, seat belt connectors, or the like instead of carabiners for fasteners in the hook up loop 29 at the end 22 at the last hookup loop gap 56. The strap hookup loop 29 could have an adjustable seat belt to adjust in and out of the loop.

The materials used for the present invention vary. A carry strap may be made with a knot 30 or prusik 36 cord 38 made with a 6 mm, 7 mm, 8 mm, 9 mm, or 10 mm rope cordage. The free ends 40 of the prusik 36 may be sewn on a sewing machine with different stitching types, and not just a bar tack, as shown in FIGS. 1C and 1D. Alternatively, the prusik 36 cordage's loose ends 40 on the bridge 44 may be tied with a double fisherman's knot or the equivalent instead. Furthermore, the prusik 36 may be composed of different textures of cordage 38 including nylon/nylon or polyester/nylon.

The strap 14 may be tubular webbing, solid webbing, or flat webbing. The strap 14 may be made with different webbing widths, including 1", 1¾", 1¹⁵⁄₁₆", 2", 2½", or 2¾". Different textures of webbing may be used for the strap 14, including nylon, polyester, cotton, cordura, kodra, polyester, nylon, rip stop nylon, polyurethane coating denier. Open cell foam and ensolite or closed cell foam may be used to provide comfort nest to the body. More compressible and therefore softer density foam may be desirable.

The strap 14 may incorporate a rubberized weight bearing handle 16. The strap 14 may be sewn with a tubular piece of vinyl, rubber, or nylon for the weight bearing handle 16. Additionally, a plastic mold could be disposed around the webbing forming the weight bearing handle 16. A reflective material may be sewn onto the strap, or painted/coated thereon to form a reflective strap along part of the strap 14 or along the entire strap 14.

An example was made using about twelve feet (12') nine inches (9") of a two (2") tubular webbing, typically used in fire and rescue response. Twenty-six inches (26") of a seven millimeter (7 mm) prusik technical cord were used to make the knot. The minding guide loop was made from about seven inches (7") length of one inch (1") tubular webbing with five inches (5") another tubular webbing inside of the seven inch (7") webbing for rigidity. Nylon thread was used in the experimental test version; however, in practice appropriately rated for weight.

In another example, the carry strap 12 was made with a 19'10½" length of two (2") inch tubular webbing. One end is folded over to create the weight bearing handle 16 with the hookup loop 29. The hookup loop has five two (2") inch and one one (1") inch hookup loop gaps 48. The one (1") inch hookup loop gap 56 is at the very end 22 of the strap 14. Altogether, the weight bearing handle 16 has two bar tacks 50 disposed five (5") inches apart, with a weight bearing handle loop 29 comprising about five (5") handle loop.

The floating minding ring 45 and handle 46 were composed of a single strap 12 inches long which is folded in the middle and sewed along one edge. That length is the folded in half to six inches end to end and sewn together. A rectangle was sewn for the handle taking up 3¼ inches along the loose ends of the folded strap opposite the fold to form the floating minding ring handle 46. The remaining loop formed the floating minding ring 45. Similarly, the prusik or handle minding ring 34 may be composed of an 8" folded along the length in the middle to form a double layer with a seam along one side thereof. An inch from one end is left unsewn so that the sewed end may be inserted one inch into the un-sewed end and the sewn together to form a closed loop.

In operation, a worker W using the carry strap 12 should use proper care to avoid injury. Proper lifting techniques are desirable for safety purposes. The carry strap 12 should be carefully inspected before each use to check that the strap 14 is free of burns, cuts, broken stitches, or excessive wear. The knot(s) 30 should be inspected before every use. Gloves should be worn during use, as well. Loose clothing must be kept out of the way when using a carbineer, or other connector 52. A carbineer 52 should always be visually checked when used to be sure it is closed with each use of the carry strap 12.

The steps involved in proper use of the emergency carry strap 12 involve placing the strap over a worker's head onto his shoulder W, as shown in FIG. 1A. Placing the strap across the body with the prusik 36 and bridge 44 in the front along with the floating minding ring 45 and floating minding ring handle 46. The hookup loop 29 is then wrapped one turn around the handle of a backboard L, stokes basket, gurney, or other equipment. The carabiner 52 is looped through one of the hook up gaps 48, perhaps the last hook up gap 56 at the end 20 of the strap 14, and then through the weight bearing handle loop 29 to secure the load L to the carry strap 12 beneath the weight bearing handle 16. The weight of the load L is then born on the weight bearing handle 16 which can them be safely lifted.

The sliding knot 30 is used to restrict movement of the free end 20 when bearing weight on the bridge 44. A three wrap prusik 36 is the preferred knot 30 because it is an excellent climbing knot and restricts sliding along a rope or strap when weight bearing but facilitates sliding along the rope or strap when the weight is removed. Prusik 36 bears the weight of a person while permitting sliding action once the weight is lifted. In operation, the strap 14 is grabbed below the minding ring 45 with the hand opposite to the weight bearing handle 16. After lifting the weight off of the prusik 36, the hand opposite can be used to move the prusik 36 up and down along the strap 14. The prusik 36 floating minding ring 45 is used to adjust the prusik 36 towards the end 22 of the strap 14, but the knot 30 is just grasped directly to move up the strap 14 away from the stop 54 at the end 22 of the carry strap 12. The weight on the weight bearing handle 16 may then be adjusted. Clothing must be kept free of the sliding knot 30 to avoid interference in the movement of the strap 14 relative to the sliding knot 30.

It is to be understood that the present invention is not limited to the embodiments described above, but encompasses any and all embodiments within the scope of the following claims.

What is claimed is:

1. A cross body rescue strap (12), comprising:
   a length of strap (14) having a first end (18) and a free second end (20);
   a weight bearing handle (16) having back and front ends (24) and (26),
      the back end (24) attached to the first end (18) of the length of strap (14), and
      a hookup loop (29) extending from the back end (24) of the weight bearing handle (16), and
      a weight bearing handle loop (28) extending from the front end (26) of the weight bearing handle (16);
   a release knot (30) having
      a loop forming a bridge (44) extending from a remainder of the release knot (30) and attached to the weight bearing handle loop (28),
      the release knot (30) slidably disposed about the length of strap (14) between the weight bearing handle (16) and the free second end (20) of the length of strap (14),
      the release knot (30) tightens about the strap (14) in response to weight born upon the bridge (44).

2. The cross body rescue strap (12) of claim 1, wherein:
   the weight bearing handle (16) is formed from a doubled over length of strap (14); or
   the weight bearing handle loop (28) is formed from a doubled over length of strap (14) forming the weight bearing handle (16); or
   the hookup loop (29) is formed from excess length of strap extending from the front end (26) of the weight bearing handle (16) which is formed from a doubled over length of strap (14); or
   combinations thereof.

3. The cross body rescue strap (12) of claim 2, wherein:
   the hookup loop (29) is composed of two layers of strap with bar tacks sewn intermittently across the two layers of strap forming hookup loop gaps (48) for engaging a retainer (52) across one of the hookup loop gaps (48) and the weight bearing handle loop (28).

4. The cross body rescue strap (12) of claim 2, wherein:
   the weight bearing handle (16) has bar tacks (32) disposed at each of the back and front ends (24) and (26) thereof.

5. The cross body rescue strap (12) of claim 2, further comprising: a carbineer or other releaseable retainer (52) disposed on an end (22) of the hookup loop (29) to accommodate the weight bearing handle loop (28).

6. The cross body rescue strap (12) of claim 1, further comprising:
   a prusik minding ring (34) encompassing the weight bearing handle loop (28) and encircling the free second end (20) of the strap (14).

7. The cross body rescue strap (12) of claim 1, wherein:
   the release knot (30) is composed of a length of rope (38), having two ends (40), bound together at the ends (40) forming the loop bridge (44) which encompasses the weight bearing handle loop (28).

8. The cross body rescue strap of (12) claim 7, wherein:
   the release knot (30) is a three wrap prusik (36) in which the length of rope (38) is folded at a middle of the rope (38) and wrapped three times around the strap (14) with the two ends (40) that are bound together extending from a middle of the knot (30) under the folded middle of the rope (38).

9. The cross body rescue strap (12) of claim 1, further comprising:
   a floating minding ring (45) disposed about the length of strap (14) adjacent the release knot (30) between the release knot (30) and the weight bearing handle (16).

10. The cross body rescue strap (12) of claim 9, wherein:
    the floating minding ring (45) has a floating minding ring handle (46) extending therefrom.

11. The cross body rescue strap (12) of claim 1, wherein:
    the hookup loop (29) is composed of two layers of strap with bar tacks sewn intermittently across the two layers of strap forming hookup loop gaps (48) for engaging a retainer (52) across one of the hookup loop gaps (48) and the weight bearing handle loop (28).

12. The cross body rescue strap (12) of claim 1, wherein:
    the free second end (20) concludes in a stop (54).

13. A cross body rescue strap (12), comprising:
    a length of strap (14) having a first end (18) and a free second end (20);
    a hookup loop (29) extending from the first end (18) of the strap (14), and
    a release knot (30) having
       a loop forming a bridge (44) extending from a remainder of the release knot (30) and attached to a weight bearing handle loop (28),
       the release knot (30) slidably disposed about the length of strap (14) between a weight bearing handle (16) and the free second end (20) of the length of strap (14),
       the release knot (30) tightens about the strap (14) in response to weight born upon the bridge (44), wherein:
       the release knot (30) is composed of a length of rope (38), having two ends (40), bound together at the ends (40) forming the loop bridge (44) which encompasses the weight bearing handle loop (28).

14. The cross body rescue strap (12) of claim 13, further comprising:
    the weight bearing handle (16) having back and front ends (24) and (26), the back end (24) attached to the first end (18) of the length of strap (14), with the weight bearing handle loop (28) extending from the front end (26) of the weight bearing handle (16); wherein:

the weight bearing handle (16) is formed from a doubled over length of strap (14); or the weight bearing handle loop (28) is formed from a doubled over length of strap (14) forming the weight bearing handle (16); or the hookup loop (29) is formed from excess length of the strap (14);

extending from the front end (26) of the weight bearing handle (16) which is formed from a doubled over length of strap (14); or combinations thereof.

15. The cross body rescue strap of (12) claim 14, wherein the release knot (30) is a three wrap prusik (36) in which the length of rope (38) is folded at a middle of the rope (38) and wrapped three times around the strap (14) with the two ends (40) that are bound together extending from a middle of the knot (30) under the folded middle of the rope (38).

16. The cross body rescue strap (12) of claim 14, further comprising:

a floating minding ring (45) disposed about the length of strap (14) adjacent the release knot (30) between the release knot (30) and the weight bearing handle (16), or a floating minding ring (45) disposed about the length of strap (14) adjacent the release knot (30) between the release knot (30) and the weight bearing handle (16), the floating minding ring (45) having a floating minding ring handle (46) extending therefrom.

17. The cross body rescue strap (12) of claim 14, further comprising:

a prusik minding ring (34) encompassing the weight bearing handle loop (28) and encircling the free second end (20) of the strap (14).

18. The cross body rescue strap (12) of claim 14, wherein: the weight bearing handle (16) has bar tacks (32) disposed at each of the back and front ends (24) and (26) thereof.

19. The cross body rescue strap (12) of claim 13, wherein: the hookup loop (29) is composed of two layers of strap with bar tacks sewn intermittently across the two layers of strap forming hookup loop gaps (48) for engaging a retainer (52) across one of the hookup loop gaps (48).

20. The cross body rescue strap (12) of claim 13, wherein: the free second end (20) concludes in a stop (54).

* * * * *